United States Patent [19]

Sorstrom et al.

[11] Patent Number: 5,261,975

[45] Date of Patent: Nov. 16, 1993

[54] STEEL FOR BALL AND ROLLER BEARINGS

[75] Inventors: Per-Olof Sorstrom, Kungalv; Thore Lundh, Hofors, both of Sweden; John M. Beswick, Montfoort, Netherlands; Frank Hengerer, Schwebheim, Fed. Rep. of Germany

[73] Assignee: AB SKF, Gothenburg, Sweden

[21] Appl. No.: 903,328

[22] Filed: Jun. 24, 1992

[30] Foreign Application Priority Data

May 27, 1992 [SE] Sweden .............................. 9201667-4

[51] Int. Cl.$^5$ .............................................. C22C 38/22
[52] U.S. Cl. .................................... 148/334; 420/105; 148/906; 384/912
[58] Field of Search ................. 148/334, 906; 420/105; 384/912

[56] References Cited

U.S. PATENT DOCUMENTS

| | | | |
|---|---|---|---|
| 3,907,553 | 9/1975 | Nagumo et al. | 420/104 |
| 4,581,079 | 4/1986 | Borik | 148/334 |
| 4,642,219 | 2/1987 | Takata et al. | 148/334 |

Primary Examiner—Deborah Yee

Attorney, Agent, or Firm—Burns, Doane, Swecker & Mathis

[57] ABSTRACT

Steel for ball and roller bearings and similar applications, containing, in % by weight:

| | |
|---|---|
| 0.70–0.95% | Carbon |
| 0.01–0.30% | Silicon |
| 0.15–0.50% | Manganese |
| 0.5–2.5% | Chromium |
| 0.10–1.5% | Molybdenum |
| max. 0.25% | Vanadium | the rest up to 100% being iron and other residual elements normally present in steel, and with the further proviso that the total area percentage of oxide inclusions must not exceed 0.0012%, that the area percentage of titanium-carbonitrides must not exceed 0.0015%, and that the area percentage of sulphide inclusions must not exceed 0.030%, the respective area percentages being measured according to the inclusion rating method defined in the Swedish Standard SS111116, wherein the field of vision shall be 0.8 mm and the number of fields of vision to be surveyed shall be at least 1000.

7 Claims, No Drawings

STEEL FOR BALL AND ROLLER BEARINGS

This invention relates to a steel for ball and roller bearings and similar applications.

Ball and roller bearings have to withstand high loads under extended periods of time and at temperatures that may temporarily rise to 250° C. Many times they are working in contaminated environments and thus must withstand abrasion by hard and abrasive particulate material. Further, ball and roller bearings must have high dimensional stability and reproducibility while at the same time being as easy as possible to manufacture.

Known in the art are various kinds of steel, which are used or have been suggested for use in the production of ball and roller bearings, components thereof, and for similar applications.

One steel widely used for ball and roller bearings is SAE 52100, containing 0.98–1.10% C, 0.15–0.35% Si, 0.25–0.45% Mn, max. 0.025% P, max. 0.025% S, 1.30–1.60% Cr, and max. 0.10% Mo. The strength of the steel, which is a mechanical property of major importance, is high and this steel results in ball and roller bearings of good mechanical properties, but still there is a need for even higher quality steel for manufacturing ball and roller bearings.

A further need is to accomplish a steel resulting in good mechanical properties while at the same time being improved with regard to ease of hot working, reproducibility of product properties such as dimensional stability and long life under highload conditions, where resistance against fractures caused by fatigue and wear are important factors.

One object of the invention is to provide an improved steel for ball and roller bearings with improved functional properties compared to prior art steels.

Another object of the invention is to provide an improved steel for ball and roller bearings with improved manufacturing properties.

A further object of the invention is to provide an improved steel for ball and roller bearings with improved life properties.

These objects are achieved with the steel for ball and roller bearings and similar applications according to the invention containing, in % by weight:

| | |
|---|---|
| 0.70–0.95% | Carbon |
| 0.01–0.30% | Silicon |
| 0.15–0.50% | Manganese |
| 0.5–2.5% | Chromium |
| 0.10–1.5% | Molybdenum |
| max. 0.25% | Vanadium | the rest up to 100% being iron and other residual elements normally present in steel, and with the further proviso that the total area percentage of oxide inclusions must not exceed 0.0012%, that the area percentage of titanium-carbonitrides must not exceed 0.0015%, and that the area percentage of sulphide inclusions must not exceed 0.030%, the respective area percentages being measured according to the inclusion rating method defined in the Swedish Standard SS111116, wherein the field of vision shall be 0.8 mm and the number of fields of vision to be surveyed shall be at least 1000.

According to one embodiment of the invention the steel contains, in % by weight:

| | |
|---|---|
| 0.78–0.85% | Carbon |
| 0.05–0.15% | Silicon |
| 0.28–0.42% | Manganese |
| 0.75–1.0% | Chromium |
| 0.25–0.30% | Molybdenum |

According to a second embodiment of the invention the steel contains, in % by weight:

| | |
|---|---|
| 0.78–0.85% | Carbon |
| 0.05–0.15% | Silicon |
| 0.28–0.42% | Manganese |
| 1.00–1.50% | Chromium |
| 0.30–1.01% | Molybdenum |

According to a third embodiment of the invention the steel contains, in % by weight:

| | |
|---|---|
| 0.78–0.85% | Carbon |
| 0.05–0.15% | Silicon |
| 0.28–0.42% | Manganese |
| 1.50–2.00% | Chromium |
| 0.30–1.0% | Molybdenum |

According to a fourth embodiment of the invention the steel contains, in % by weight:

| | |
|---|---|
| 0.78–0.85% | Carbon |
| 0.05–0.15% | Silicon |
| 0.28–0.42% | Manganese |
| 2.00–2.50% | Chromium |
| 0.30–1.0% | Molybdenum |

The features determining the characteristics of a steel are the content of alloying elements, microstructure and metallurgical imperfections. While the presence of certain elements in a steel of this kind is harmful and should be avoided as much as possible, that of others has both positive and negative consequences regarding properties and workability. One example of an alloying element of the latter sort is silicon. By substantially accumulating in the ferrite phase, silicon has a negative effect on the cold working properties.

Carbon is the alloying element known to contribute the most to the hardenability and hardness of steel. However, increasing the carbon content too much above about 0.8% carbon not only affects hardenability negatively, but it will also complicate the soft annealing procedure due to the carbide network formed.

Chromium and molybdenum are strong carbide forming elements, and contribute significantly to the properties and hardenability of the steel. When the amount of Mo is increased and the amount of Cr is decreased, this will result in enhanced strength properties.

Vanadium may have a positive effect on the properties of the steel due to its ability of forming carbides which are hard to dissolve, thereby adding to the toughness of the steel. Above 0.25% V, however, the hardenability is reduced when moderate austenitizing temperatures are used.

The combination according to the invention of a moderate carbon content with a low silicon content, a comparatively high molybdenum content and reasonably high manganese and chromium contents, results in a product which has improved manufacturing properties, while, at the same time, the finished products have improved characteristics.

With a maximum content of non-metallic inclusions in the steel corresponding to the above, improved life characteristics are obtained. The different types of inclusions are not additive, i.e. the maximum content of each of the oxide, sulphide and titanium-carbonitrides inclusions, respectively, for obtaining improved life characteristics, is not affected by the actual contents of the other two types of inclusions.

The steel according to the invention can be produced by known methods, their adaptation to allow control of the concentrations of major, minor and residual alloying elements according to the invention being within the easy reach of the expert in the art of producing bearing steel.

We claim:

1. Steel for ball and roller bearings and similar applications, containing, in % by weight:
   0.70–0.95% Carbon
   0.01 to less than 0.15% Silicon
   0.15–0.50% Manganese
   0.5–2.5% Chromium
   0.10–1.5% Molybdenum
   0.25% Vanadium
the rest up to 100% being iron and other residual elements normally present in steel, and
with the further proviso that the total area percentage of oxide inclusions must not exceed 0.0012%, that the area percentage of titanium-carbonitrides must not exceed 0.0015%, and that the area percentage of sulphide inclusions must not exceed 0.030%, the respective area percentages being measured according to the inclusion rating method defined in the Swedish Standard SS111116, wherein the field of vision shall be 0.8 mm and the number of fields of vision to be surveyed shall be at least 1000.

2. Steel according to claim 1, comprising, in % by weight:
   0.78–0.85% Carbon
   0.05 to less than 0.15% Silicon
   0.28–0.42% Manganese
   0.75–1.0% Chromium
   0.25–0.30% Molybdenum.

3. Steel according to claim 1, comprising, in % by weight:
   0.78–0.85% Carbon
   0.05 to less than 0.15% Silicon
   0.28–0.42% Manganese
   1.00–1.50% Chromium
   0.30–1.0% Molybdenum.

4. Steel according to claim 1, comprising, in % by weight:
   0.78–0.85% Carbon
   0.05 to less than 0.15% Silicon
   0.28–0.42% Manganese
   1.50–2.00% Chromium
   0.30–1.0% Molybdenum.

5. Steel according to claim 1, comprising, in % by weight:
   0.78–0.85% Carbon
   0.05 to less than 0.15% Silicon
   0.28–0.42% Manganese
   2.00–2.50% Chromium
   0.30–1.0% Molybdenum.

6. Steel for ball and roller bearings and similar applications, containing, in % by weight:
   0.78–0.85% Carbon
   0.05–0.15% Silicon
   0.28–0.42% Manganese
   2.00–2.50% Chromium
   0.30–1.0% Molybdenum
   max. 0.25% Vanadium
the rest up to 100% being iron and other residual elements normally present in steel, and
with the further proviso that the total area percentage of oxide inclusions must not exceed 0.0012%, that the area percentage of titanium-carbonitrides must not exceed 0.0015%, and that the area percentage of sulphide inclusions must not exceed 0.030%, the respective area percentages being measured according to the inclusion rating method defined in the Swedish Standard SS111116, wherein the field of vision shall be 0.8 mm and the number of fields of vision to be surveyed shall be at least 1000.

7. Steel for ball and roller bearings and similar applications, containing, in % by weight:
   0.70–0.95% Carbon
   0.01–0.30% Silicon
   0.15–0.50% Manganese
   2.00–2.50% Chromium
   0.20–1.5% Molybdenum
   max. 0.25% Vanadium
the rest up to 100% being iron and other residual elements normally present in steel.

* * * * *

UNITED STATES PATENT AND TRADEMARK OFFICE
CERTIFICATE OF CORRECTION

PATENT NO. : 5,261,975
DATED : November 16, 1993
INVENTOR(S) : Per-Olof SORSTROM et al It is certified that error appears in the above-indentified patent and that said Letters Patent is hereby corrected as shown below:

Column 3, line 25, "0.25% Vanadium" should read --max. 0.25% Vanadium--.

Signed and Sealed this

Nineteenth Day of July, 1994

Attest:

BRUCE LEHMAN

*Attesting Officer*   *Commissioner of Patents and Trademarks*